United States Patent
Lin

(10) Patent No.: US 9,036,230 B1
(45) Date of Patent: May 19, 2015

(54) TORSIONAL ELECTROSTATIC COMBDRIVE WITH INCREASED STIFFNESS

(71) Applicant: Chen-Chi Lin, San Jose, CA (US)

(72) Inventor: Chen-Chi Lin, San Jose, CA (US)

( * ) Notice: Subject to any disclaimer, the term of this patent is extended or adjusted under 35 U.S.C. 154(b) by 0 days.

(21) Appl. No.: 14/139,884

(22) Filed: Dec. 24, 2013

(51) Int. Cl.
*H02N 1/00* (2006.01)
*G02B 26/10* (2006.01)

(52) U.S. Cl.
CPC .............. *H02N 1/006* (2013.01); *G02B 26/105* (2013.01); *H02N 1/008* (2013.01)

(58) Field of Classification Search
CPC ...................................................... H02N 1/008
See application file for complete search history.

(56) References Cited

U.S. PATENT DOCUMENTS

| | | | | |
|---|---|---|---|---|
| 5,428,259 A * | 6/1995 | Suzuki | ........................... | 310/309 |
| 6,384,952 B1 * | 5/2002 | Clark et al. | ................ | 359/224.1 |
| 6,535,319 B2 * | 3/2003 | Buzzetta et al. | ........... | 359/225.1 |
| 6,713,367 B2 * | 3/2004 | Solgaard et al. | ............... | 438/459 |
| 6,758,983 B2 * | 7/2004 | Conant et al. | ...................... | 216/2 |
| 6,819,822 B2 * | 11/2004 | Behin et al. | ...................... | 385/18 |
| 6,925,710 B1 * | 8/2005 | Scalf et al. | ....................... | 29/847 |
| 7,079,299 B1 | 7/2006 | Conant et al. | | |
| 7,205,174 B2 * | 4/2007 | Hung | ............................... | 438/52 |
| 7,342,346 B2 * | 3/2008 | Kim et al. | ...................... | 310/309 |
| 7,535,620 B2 * | 5/2009 | Zhou | ............................ | 359/290 |
| 8,134,277 B2 * | 3/2012 | Moidu | ......................... | 310/309 |
| 8,418,555 B2 * | 4/2013 | Foster et al. | ............... | 73/514.32 |
| 2003/0073261 A1 * | 4/2003 | Olav et al. | ........................ | 438/67 |
| 2006/0033389 A1 * | 2/2006 | Esashi et al. | ................. | 310/75 R |
| 2008/0106168 A1 * | 5/2008 | Park | .............................. | 310/309 |
| 2008/0197748 A1 * | 8/2008 | Naftali et al. | ................. | 310/309 |
| 2011/0310452 A1 * | 12/2011 | Lin | ............................ | 359/200.7 |

* cited by examiner

*Primary Examiner* — Charlie Y Peng
(74) *Attorney, Agent, or Firm* — Chen-Chi Lin

(57) ABSTRACT

A torsional electrostatic combdrive with increased stiffness is disclosed. The torsional electrostatic combdrive includes a movable combteeth group, a stationary combteeth group, and a stationary link group. The stiffness of the torsional electrostatic combdrive is increased by coupling the stationary link group to the stationary combteeth group. Advantageously, the present invention promotes reduced gaps of engaging combteeth, increased snap-in voltage of combteeth, and reduced driving voltage of the combdrive.

20 Claims, 5 Drawing Sheets

TORSIONAL ELECTROSTATIC COMBDRIVE WITH INCREASED STIFFNESS

INCORPORATION BY REFERENCE

U.S. Pat. No. 7,079,299 to Conant et al. is hereby incorporated by reference.

FIELD OF THE INVENTION

This invention relates generally to Micro-Electro Mechanical Systems (MEMS) and Nano-Electro Mechanical Systems (NEMS). More particularly, the present invention relates to a torsional electrostatic combdrive with increased stiffness. Advantageously, the present invention promotes reduced gaps of engaging combteeth, increased snap-in voltage of combteeth, and reduced driving voltage of the combdrive.

BACKGROUND OF THE INVENTION

MEMS and NEMS are three-dimensional devices having one or more dimensions ranging from nanometers to millimeters in size.

U.S. Pat. No. 7,079,299 to Conant et al. discloses a torsional electrostatic combdrive for use in a micromirror. U.S. Pat. No. 6,819,822 to Behin et al. discloses torsional electrostatic combdrives for use in a two-dimensional canning actuator. U.S. Pat. No. 6,751,395 to Novotny et al. discloses a torsional electrostatic combdrive for use in a variable optical attenuator (VOA). U.S. Pat. No. 6,628,856 to Costello et al. discloses a torsional electrostatic combdrive for use in a optical switch. U.S. Pat. No. 7,535,620 to Zhou discloses a micromirror including a mirror support. The mirror support includes a first comb edge and a second comb edge opposed to the first comb edge. Combteeth extends outwardly from each of the first and second comb edges.

SUMMARY OF THE INVENTION

The present invention relates to a torsional electrostatic combdrive with increased stiffness. The torsional electrostatic combdrive includes a movable combteeth group, a stationary combteeth group, and a stationary link group. The stiffness of the torsional electrostatic combdrive is increased by coupling the stationary link group to the stationary combteeth group.

The torsional electrostatic combdrive of the present invention may be for use in a micromirror, a two-dimensional scanning actuator, a VOA, or an optical switch. Discussion of the specific applications is illustrative and not intended to limit the scope of the present invention.

DETAILED DESCRIPTION OF THE INVENTION

Figure 1:
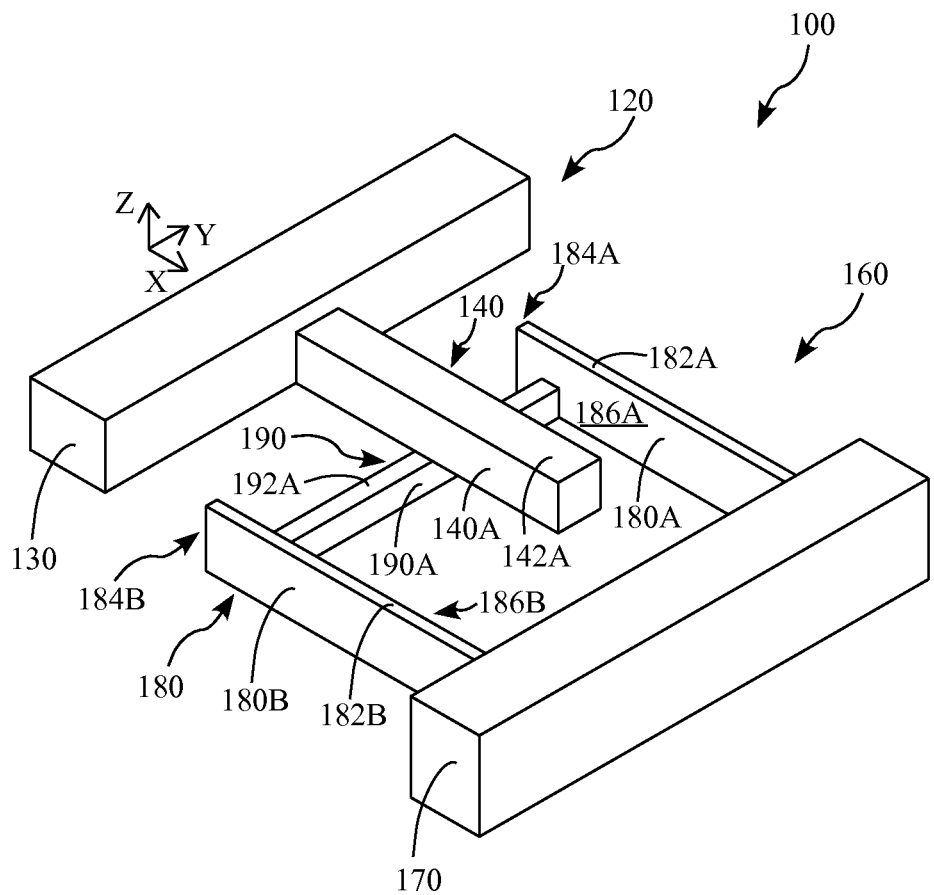
FIG. 1 shows a perspective view of a torsional electrostatic combdrive configured in accordance with one embodiment of the present invention.

FIG. 1 shows a torsional electrostatic combdrive 100 configured in accordance with one embodiment of the present invention. The combdrive 100 comprises a movable assembly 120 and a stationary assembly 160. The movable assembly 120 is to rotate about a first direction (Y-axis). The movable assembly 120 includes a movable body portion 130 and a movable combteeth group 140. The movable combteeth group 140 extends away from the movable body portion 130 and is generally along a second direction (X-axis) perpendicular to the first direction (Y-axis). The movable combteeth group 140 contains a first movable combtooth 140A (For example, only one movable combtooth 140A is shown in FIG. 1) having a first movable top surface 142A. The stationary assembly 160 includes a stationary body portion 170, a stationary combteeth group 180, and a stationary link group 190. The stationary combteeth group 180 extends away from the stationary body portion 170 for engaging the movable combteeth group 140. The stationary combteeth group 180 contains a first stationary combtooth 180A having a first stationary top surface 182A and a second stationary combtooth 180B having a second stationary top surface 182B. The stationary link group 190 is away from the stationary body portion 170 and is coupled to the stationary combteeth group 180. The first movable top surface 142A is located at a higher position than the first 182A and second 182B stationary top surfaces during a combdrive resting state. In another embodiment, the first movable combtooth 140A is positioned entirely above the first 180A and second 180B stationary combteeth by a predetermined vertical displacement during the combdrive resting state.

In one embodiment, the rotated position of the movable assembly 120 is adjusted in response to a capacitance value measured between the movable combteeth group 140 and the stationary combteeth group 180.

In a more detailed embodiment, the stationary link group 190 contains a first stationary link member 190A (For example, only one stationary link member 190A is shown in FIG. 1) disposed between the first 180A and second 180B stationary combteeth. In one embodiment, the first stationary link member 190A electrically and mechanically interconnects the first 180A and second 180B stationary combteeth. In one embodiment, the first stationary link member 190A and the first 180A and second 180B stationary combteeth are a single part having material continuity. In another embodiment, the first stationary link member 190A and the first 180A and second 180B stationary combteeth are an assembly of sub-parts. In one embodiment, the first 180A and second 180B stationary combteeth each have a distal end (184A and 184B respectively) that is furthest away from the stationary body portion 170. The first stationary link member 190A is attached to the first 180A and second 180B stationary combteeth at or near the distal ends 184A and 184B. In one embodiment, the first stationary combtooth 180A defines a first side surface 186A and the second stationary combtooth 180B defines a second side surface 186B. The first side surface 186A faces the second side surface 186B. The first stationary link member 190A is attached to the first 180A and second 180B stationary combteeth between the first 186A and second 186B side surfaces. In one embodiment, the first stationary link member 190A defines a stationary top surface 192A. The first stationary top surface 182A of the first stationary combtooth 180A is located at a higher position than the stationary top surface 192A of the first stationary link member 190A.

In one embodiment, the first stationary combtooth 180A has a first average width value and the first movable combtooth 140A has a second average width value. The first average width value is smaller than the second average width value. For example, an average width value may be obtained by measuring values of the width for at least three different, distributed, equally spaced locations and then averaging these values. The lateral stiffness of the stationary combteeth group 180 may be increased by coupling the stationary link group 190 to the stationary combteeth group 180. The lateral stiffness of the movable combteeth group 140 may be increased by increasing the width of the movable combteeth (For example, only one movable combtooth 140A is shown in FIG. 1).

Figure 2A:
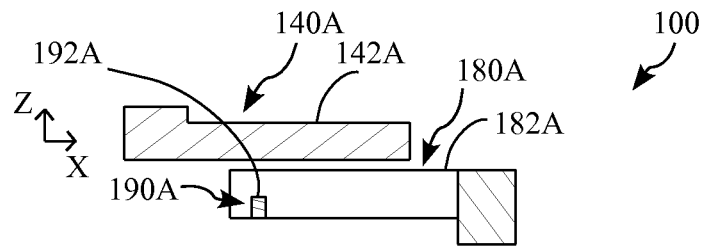
FIGS. 2A-D show cross-sectional views of the torsional electrostatic combdrive of FIG. 1 taken along the XZ-plane during one resting, one activation, another activation, and one runaway states.

FIGS. 2A-D show cross-sectional views of the torsional electrostatic combdrive 100 of FIG. 1 taken along the XZ-plane. FIG. 2A shows the torsional electrostatic combdrive 100 undergoing a resting state. The first movable top surface 142A may be located at a higher position than the first stationary top surface 182A. The first movable combtooth 140A may be positioned entirely above the first stationary combtooth 180A by a predetermined vertical displacement. The first stationary top surface 182A of the first stationary combtooth 180A may be located at a higher position than the stationary top surface 192A of the first stationary link member 190A.

Figure 2B:
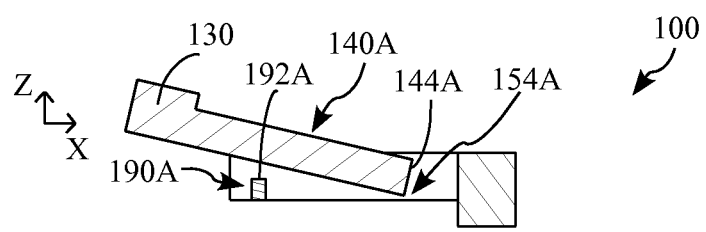

FIG. 2B shows the torsional electrostatic combdrive 100 undergoing one possible activation state. In one embodiment, the first movable combtooth 140A has a distal end 144A that is furthest away from the movable body portion 130. A portion (near the lower tip 154A) of the distal end 144A of the first movable combtooth 140A is located at a lower position than the stationary top surface 192A of the first stationary link member 190A during one or more combdrive activation states.

Figure 2C:
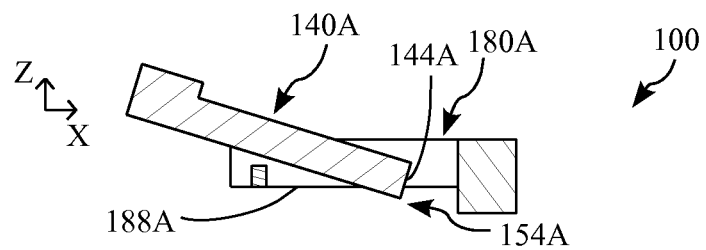

FIG. 2C shows the torsional electrostatic combdrive 100 undergoing another possible activation state. In one embodiment, the first stationary combtooth 180A defines a stationary bottom surface 188A. An other portion (near the lower tip 154A) of the distal end 144A of the first movable combtooth 140A is located at a lower position than the stationary bottom surface 188A of the first stationary combtooth 180A during an other or more combdrive activation states.

Figure 2D:
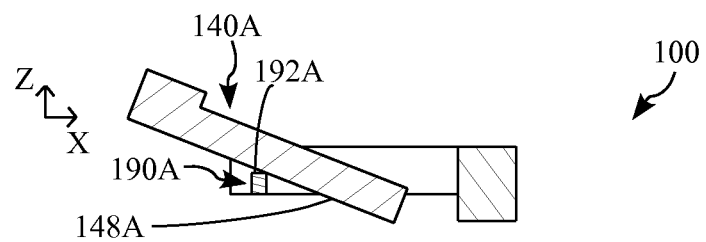

FIG. 2D shows the torsional electrostatic combdrive 100 undergoing a possible combdrive runaway state. In one embodiment, the first movable combtooth 140A defines a movable bottom surface 148A. The movable bottom surface 148A of the first movable combtooth 140A contacts the stationary top surface 192A of the first stationary link member 190A during a combdrive runaway state. For example, a combdrive runaway state may be induced by a sudden change of the driving voltage. The first stationary link member 190A may serve as a stopper.

Figure 3A:
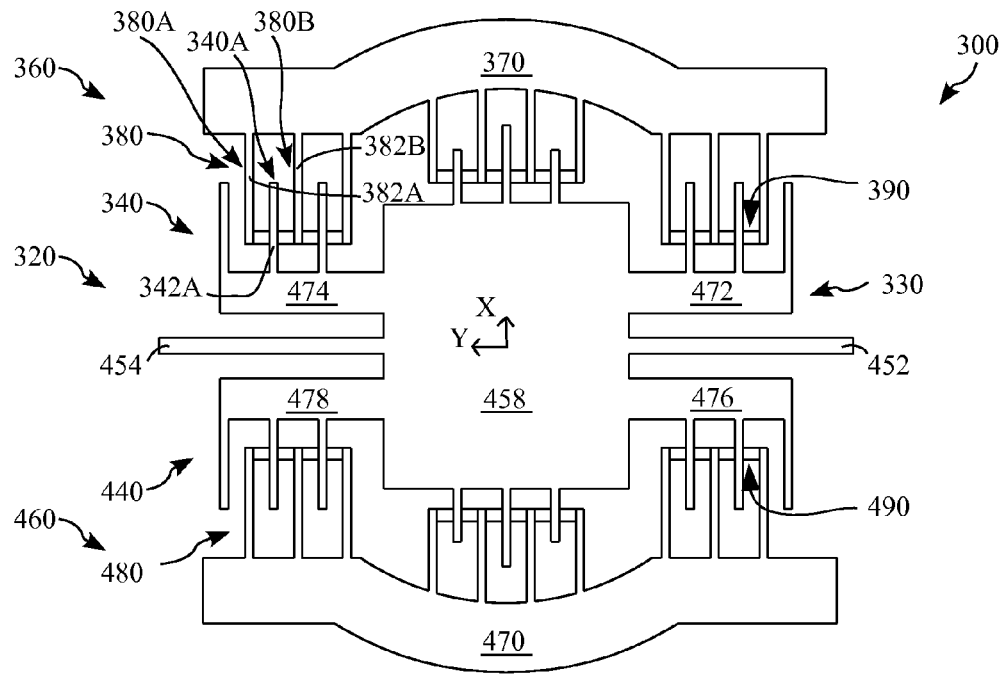
FIG. 3A shows a plan view of a torsional electrostatic combdrive configured in accordance with another embodiment of the present invention.

FIG. 3A shows a torsional electrostatic combdrive 300 configured in accordance with one embodiment of the present invention. The combdrive 300 comprises a movable assembly 320 and a stationary assembly 360. The movable assembly 320 is to rotate about a first direction (Y-axis). The movable assembly 320 includes a movable body portion 330 and a movable combteeth group 340. The movable combteeth group 340 extends away from the movable body portion 330 and is generally along a second direction (X-axis) perpendicular to the first direction (Y-axis). The movable combteeth group 340 contains a first movable combtooth 340A having a first movable top surface 342A. The stationary assembly 360 includes a stationary body portion 370, a stationary combteeth group 380, and a stationary link group 390. The stationary combteeth group 380 extends away from the stationary body portion 370 for engaging the movable combteeth group 340. The stationary combteeth group 380 contains a first stationary combtooth 380A having a first stationary top surface 382A and a second stationary combtooth 380B having a second stationary top surface 382B. The stationary link group 390 is away from the stationary body portion 370 and is coupled to the stationary combteeth group 380. The first movable top surface 342A is located at a higher position than the first 382A and second 382B stationary top surfaces during a combdrive resting state. In a more detailed embodiment, the torsional electrostatic combdrive 300 further comprises an other stationary assembly 460. The other stationary assembly 460 includes an other stationary body portion 470, an other stationary combteeth group 480, and an other stationary link group 490. The other stationary combteeth group 480 extends away from the other stationary body portion 470. The other stationary link group 490 is away from the other stationary body portion 470 and is coupled to the other stationary combteeth group 480. The movable assembly 320 further includes an other movable combteeth group 440. The other movable combteeth group 440 extends away from the movable body portion 330 in an opposite direction (−X direction) from the movable combteeth group 340. The other stationary combteeth group 480 of the other stationary assembly 460 engages the other movable combteeth group 440. In another more detailed embodiment, the movable assembly 320 further includes a mirror 458 and one or more torsional springs (For example, two torsional springs 452 and 454 are shown in FIG. 3A). In one embodiment, the movable body portion 330 contains four spines 472, 474, 476, and 478 and the mirror 458. For example, the mirror 458 is for use in a MEMS micromirror or a MEMS optical switch. For example, the torsional electrostatic combdrive 300 may be made of silicon.

Figure 3B:
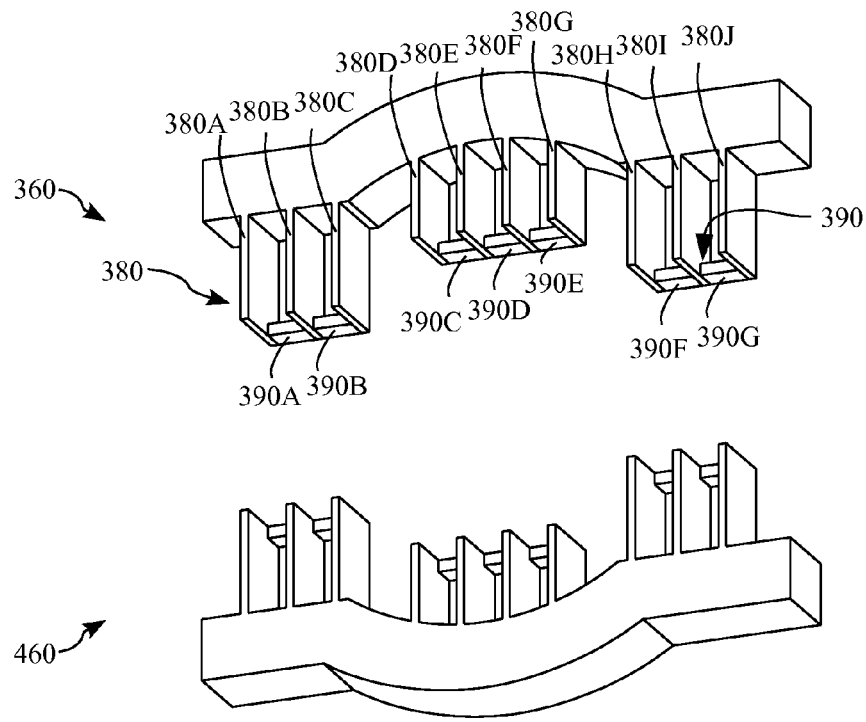
FIG. 3B shows an angled view of the stationary assemblies of the torsional electrostatic combdrive of FIG. 3A.

FIG. 3B shows an angled view of the stationary assemblies 360 and 460 of the torsional electrostatic combdrive 300 of FIG. 3A. In one embodiment, the stationary combteeth group 380 further contains a plurality of stationary combteeth 380C-J (For example, ten stationary combteeth 380A-J of the stationary combteeth group 380 are shown in FIG. 3B). The stationary link group 390 contains a plurality of stationary link members 390A-G (For example, seven stationary link members 390A-G of the stationary link group 390 are shown in FIG. 3B). The plurality of stationary combteeth 380A-J each are coupled to at least one of the plurality of stationary link members 390A-G.

Figure 4A:
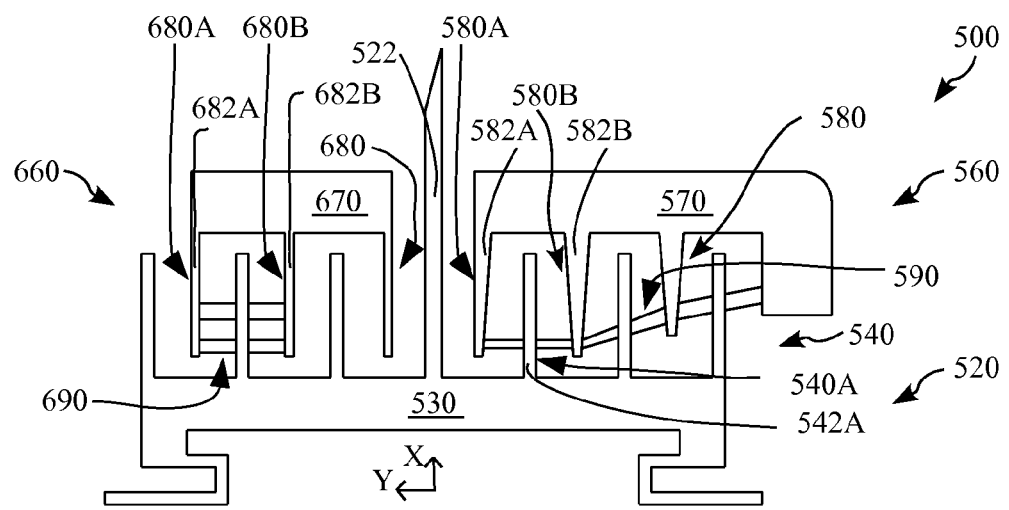
FIG. 4A shows a plan view of a torsional electrostatic combdrive configured in accordance with still another embodiment of the present invention.

FIG. 4A shows a torsional electrostatic combdrive 500 configured in accordance with one embodiment of the present invention. The combdrive 500 comprises a movable assembly 520 and a stationary assembly 560. The movable assembly 520 is to rotate about a first direction (Y-axis). The movable assembly 520 includes a movable body portion 530 and a movable combteeth group 540. The movable combteeth group 540 extends away from the movable body portion 530 and is generally along a second direction (X-axis) perpendicular to the first direction (Y-axis). The movable combteeth group 540 contains a first movable combtooth 540A having a first movable top surface 542A. The stationary assembly 560 includes a stationary body portion 570, a stationary combteeth group 580, and a stationary link group 590. The stationary combteeth group 580 extends away from the stationary body portion 570 for engaging the movable combteeth group 540. The stationary combteeth group 580 contains a first stationary combtooth 580A having a first stationary top surface 582A and a second stationary combtooth 580B having a second stationary top surface 582B. The stationary link group 590 is away from the stationary body portion 570 and is coupled to the stationary combteeth group 580. The first movable top surface 542A is located at a higher position than the first 582A and second 582B stationary top surfaces during a combdrive resting state. In a more detailed embodiment, the movable assembly 520 further includes a micro blade 522 coupled to the movable body portion 530. For example, the micro blade 522 is for use in a VOA. In one embodiment, the torsional electrostatic combdrive 500 further comprises another stationary assembly 660. The other stationary assembly 660 includes an other stationary body portion 670, an other stationary combteeth group 680, and an other stationary link group 690. The other stationary combteeth group 680 extends away from the other stationary body portion 670 for engaging the movable combteeth group 540. The other stationary combteeth group 680 contains an other first stationary combtooth 680A having an other first stationary top surface 682A and an other second stationary combtooth 680B having an other second stationary top surface 682B. The other stationary link group 690 is away from the other stationary body portion 670 and is coupled to the other stationary combteeth group 680. The first movable top surface 542A is located at a higher position than the other first 682A and second 682B stationary top surfaces during a combdrive resting state.

Figure 4B:
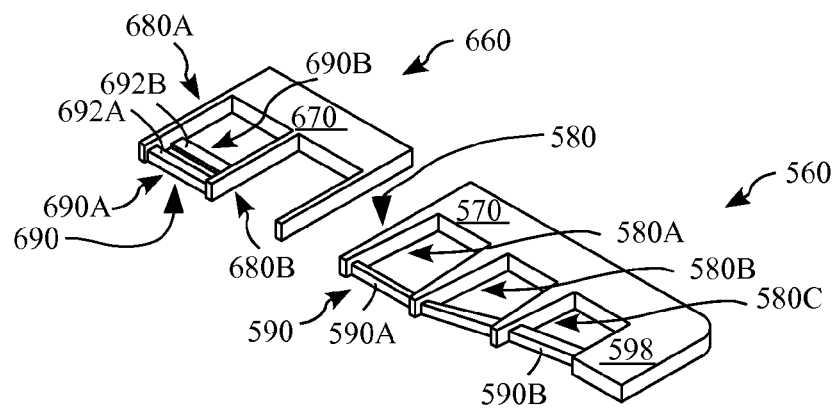
FIG. 4B shows a perspective view of the stationary assemblies of the torsional electrostatic combdrive of FIG. 4A.

FIG. 4B shows a perspective view of the stationary assemblies 560 and 660 of the torsional electrostatic combdrive 500 of FIG. 4A. In one embodiment, the stationary link group 590 contains a first stationary link member 590A disposed between the first 580A and second 580B stationary combteeth. The stationary assembly 560 further includes a stationary support member 598 extending away from the stationary body portion 570. The stationary combteeth group 580 further contains a third stationary combtooth 580C adjacent the stationary support member 598. The stationary link group 590 further contains a second stationary link member 590B disposed between the stationary support member 598 and the third stationary combtooth 580C. In one embodiment, the other stationary link group 690 contains an other first stationary link member 690A and an other second stationary link member 690B disposed between the other first 680A and the other second 680B stationary combteeth. The other first stationary link member 690A is located at a further position from the other stationary body portion 670 than the other second stationary link member 690B. The other first stationary link member 690A defines a first stationary top surface 692A and the other second stationary link member 690B defines a second stationary top surface 692B. The first stationary top surface 692A is located at a higher position than the second stationary top surface 692B. The combteeth may take different shapes. For example, combteeth 580A, 580B, and 580C of tapered shape and combteeth 680A and 680B of rectangular prism shape are shown in FIG. 4B.

Figure 5A:
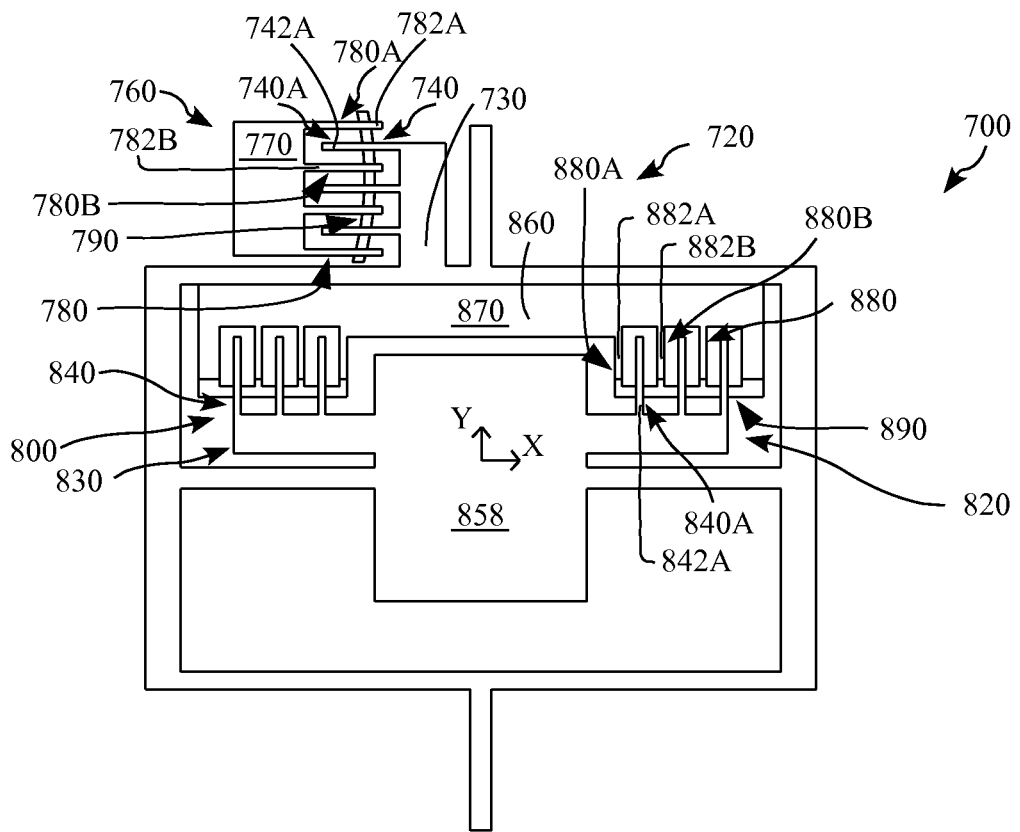
FIG. 5A shows a plan view of a two-dimensional torsional electrostatic combdrive configured in accordance with yet another embodiment of the present invention.

FIG. 5A shows a torsional electrostatic combdrive 700 configured in accordance with one embodiment of the present invention. The combdrive 700 comprises a movable assembly 720 and a stationary assembly 760. The movable assembly 720 is to rotate about a first direction (Y-axis). The movable assembly 720 includes a movable body portion 730 and a movable combteeth group 740. The movable combteeth group 740 extends away from the movable body portion 730 and is generally along a second direction (X-axis, either +X or −X direction) perpendicular to the first direction (Y-axis). The movable combteeth group 740 contains a first movable combtooth 740A having a first movable top surface 742A. The stationary assembly 760 includes a stationary body portion 770, a stationary combteeth group 780, and a stationary link group 790. The stationary combteeth group 780 extends away from the stationary body portion 770 for engaging the movable combteeth group 740. The stationary combteeth group 780 contains a first stationary combtooth 780A having a first stationary top surface 782A and a second stationary combtooth 780B having a second stationary top surface 782B. The stationary link group 790 is away from the stationary body portion 770 and is coupled to the stationary combteeth group 780. The first movable top surface 742A is located at a higher position than the first 782A and second 782B stationary top surfaces during a combdrive resting state. The movable assembly 720 further includes a sub-combdrive 800. The sub-combdrive 800 comprises an other movable assembly 820 and a relatively stationary assembly 860. The relatively stationary assembly 860 is coupled to the movable body portion 730. The relatively stationary assembly 860 is stationary relative to the movable body portion 730. The other movable assembly 820 is to rotate about the second direction (X-axis). The other movable assembly 820 includes an other movable body portion 830 and an other movable combteeth group 840. The other movable combteeth group 840 extends away from the other movable body portion 830 and is generally along the first direction (Y axis, either +Y or −Y direction). The other movable combteeth group 840 contains an other first movable combtooth 840A having an other first movable top surface 842A. The relatively stationary assembly 860 includes a relatively stationary body portion 870, a relatively stationary combteeth group 880, and a relatively stationary link group 890. The relatively stationary combteeth group 880 extends away from the relatively stationary body portion 870 for engaging the other movable combteeth group 840. The relatively stationary combteeth group 880 contains a first relatively stationary combtooth 880A having a first relatively stationary top surface 882A and a second relatively stationary combtooth 880B having a second relatively stationary top surface 882B. The relatively stationary link group 890 is away from the relatively stationary body portion 870 and is coupled to the relatively stationary combteeth group 880. The other first movable top surface 842A is located at a higher position than the first 882A and second 882B relatively stationary top surfaces during a combdrive resting state. In one embodiment, the other movable assembly 820 further includes an mirror 858.

Figure 5B:
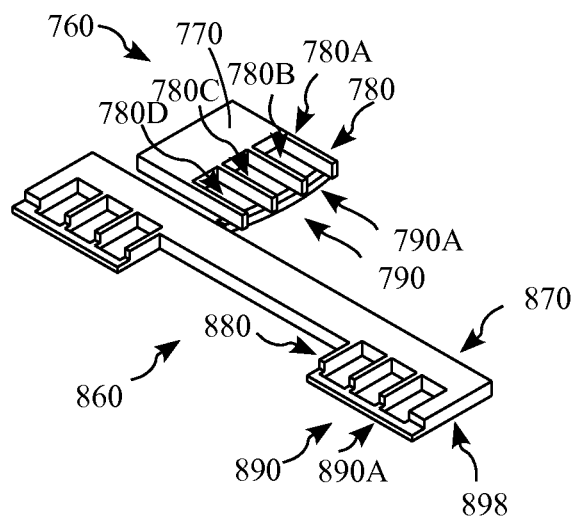
FIG. 5B shows a perspective view of the stationary assembly and the relatively stationary assembly of the torsional electrostatic combdrive of FIG. 5A.

FIG. 5B shows an perspective view of the stationary assembly 760 and the relatively stationary assembly 860 of the torsional electrostatic combdrive 700 of FIG. 5A. In one embodiment, the stationary link group 790 contains a long stationary link member 790A. The stationary combteeth group 780 further contains a plurality of stationary combteeth 780C-D (For example, four stationary combteeth 780A-D of the stationary combteeth group 780 are shown in FIG. 5B). The first 780A, second 780B, and plurality of stationary combteeth 780C-D each have a distal end that is furthest away from the stationary body portion 770. The distal ends thereof each are coupled to the long stationary link member 790A. In one embodiment, the long stationary link member 790A and the first 780A, second 780B, and plurality of stationary combteeth 780C-D are an assembly of sub-parts. For example, the first 780A, second 780B, and plurality of stationary combteeth 780C-D are coupled to the long stationary link member 790A by anodic bonding. For example, the long stationary link member 790A may be made of silicon or glass.

In another embodiment, the relatively stationary link group 890 contains a long relatively stationary link member 890A. The relatively stationary assembly 860 further includes a relatively stationary support member 898 extending away from the relatively stationary body portion 870. The long relatively stationary link member 890A is coupled to the relatively stationary support member. 898. In one embodiment, the long relatively stationary link member 890A and the relatively stationary combteeth group 880 are a single part having material continuity. The single part having material continuity may be made by etching process.

Those of ordinary skill in the art may recognize that modifications of the embodiments disclosed herein are possible. For example, the stationary link member 390A of FIG. 3B is shown of rectangular prism shape, the stationary link member 390A may take other shapes including tapered shape, I-beam shape, X-shape, and hollow shape. Other modifications may occur to those of ordinary skill in this art, and all such modifications are deemed to fall within the purview of the present invention, as defined by the claims.

The invention claimed is:

1. A torsional electrostatic combdrive, comprising:
a movable assembly to rotate about a first direction, the movable assembly including:
a movable body portion; and
a movable combteeth group extending away from the movable body portion and being generally along a second direction perpendicular to the first direction, the movable combteeth group containing a first movable combtooth having a first movable top surface; and
a stationary assembly including:
a stationary body portion;
a stationary combteeth group extending away from the stationary body portion for engaging the movable combteeth group, the stationary combteeth group containing:
a first stationary combtooth having a first stationary top surface; and
a second stationary combtooth having a second stationary top surface;
and
a stationary link group away from the stationary body portion and coupled to the stationary combteeth group;
wherein the first movable top surface is located at a higher position than the first and second stationary top surfaces during a combdrive resting state; and
wherein the stationary link group contains a first stationary link member disposed between the first and second stationary combteeth.

2. The torsional electrostatic combdrive of claim 1, wherein the first stationary link member and the first and second stationary combteeth are a single part having material continuity.

3. The torsional electrostatic combdrive of claim 1, wherein the first stationary link member and the first and second stationary combteeth are an assembly of sub-parts.

4. The torsional electrostatic combdrive of claim 1, wherein the first stationary link member electrically and mechanically interconnects the first and second stationary combteeth.

5. The torsional electrostatic combdrive of claim 1, wherein the first and second stationary combteeth each have a distal end that is furthest away from the stationary body portion and wherein the first stationary link member is attached to the first and second stationary combteeth at or near the distal ends thereof.

6. The torsional electrostatic combdrive of claim 1, wherein the first stationary combtooth defines a first side surface and wherein the second stationary combtooth defines a second side surface, the first side surface facing the second side surface, and wherein the first stationary link member is attached to the first and second stationary combteeth between the first and second side surfaces.

7. The torsional electrostatic combdrive of claim 1, wherein the first stationary link member defines a stationary top surface and wherein the first stationary top surface of the first stationary combtooth is located at a higher position than the stationary top surface of the first stationary link member.

8. The torsional electrostatic combdrive of claim 7, wherein the first movable combtooth has a distal end that is furthest away from the movable body portion and wherein a portion of the distal end of the first movable combtooth is located at a lower position than the stationary top surface of the first stationary link member during one or more combdrive activation states.

9. The torsional electrostatic combdrive of claim 8, wherein the first stationary combtooth defines a stationary bottom surface and wherein an other portion of the distal end of the first movable combtooth is located at a lower position than the stationary bottom surface of the first stationary combtooth during an other or more combdrive activation states.

10. The torsional electrostatic combdrive of claim 1, wherein the first movable combtooth defines a movable bottom surface and wherein the movable bottom surface of the first movable combtooth contacts the stationary top surface of the first stationary link member during a combdrive runaway state.

11. The torsional electrostatic combdrive of claim 1, wherein the stationary assembly further includes a stationary support member extending away from the stationary body portion, wherein the stationary combteeth group further contains a third stationary combtooth adjacent the stationary support member, and wherein the stationary link group further contains a second stationary link member disposed between the stationary support member and the third stationary combtooth.

12. A torsional electrostatic combdrive, comprising:
a movable assembly to rotate about a first direction, the movable assembly including:
a movable body portion; and
a movable combteeth group extending away from the movable body portion and being generally along a second direction perpendicular to the first direction, the movable combteeth group containing a first movable combtooth having a first movable top surface;
and
a stationary assembly including:
a stationary body portion;
a stationary combteeth group extending away from the stationary body portion for engaging the movable combteeth group, the stationary combteeth group containing:
a first stationary combtooth having a first stationary top surface; and
a second stationary combtooth having a second stationary top surface;

and
a stationary link group away from the stationary body portion and coupled to the stationary combteeth group;
wherein the first movable top surface is located at a higher position than the first and second stationary top surfaces during a combdrive resting state; and
wherein the movable assembly further includes a sub-combdrive comprising:
an other movable assembly to rotate about the second direction, the other movable assembly including:
an other movable body portion; and
an other movable combteeth group extending away from the other movable body portion and being generally along the first direction, the other movable combteeth group containing an other first movable combtooth having an other first movable top surface;
and
a relatively stationary assembly coupled to the movable body portion, the relatively stationary assembly including:
a relatively stationary body portion;
a relatively stationary combteeth group extending away from the relatively stationary body portion for engaging the other movable combteeth group, the relatively stationary combteeth group containing:
a first relatively stationary combtooth having a first relatively stationary top surface; and
a second relatively stationary combtooth having a second relatively stationary top surface;
and
a relatively stationary link group away from the relatively stationary body portion and coupled to the relatively stationary combteeth group;
wherein the other first movable top surface is located at a higher position than the first and second relatively stationary top surfaces during the combdrive resting state.

13. A torsional electrostatic combdrive, comprising:
a movable assembly to rotate about a first direction, the movable assembly including:
a movable body portion; and
a movable combteeth group extending away from the movable body portion and being generally along a positive second direction perpendicular to the first direction, the movable combteeth group containing a first movable combtooth having a first movable top surface;
and
a stationary assembly including:
a stationary body portion;
a stationary combteeth group extending away from the stationary body portion for engaging the movable combteeth group, the stationary combteeth group containing:
a first stationary combtooth having a first stationary top surface; and
a second stationary combtooth having a second stationary top surface;
and
a stationary link group away from the stationary body portion and coupled to the stationary combteeth group;
wherein the first movable top surface is located at a higher position than the first and second stationary top surfaces during a combdrive resting state;
wherein, in a third direction perpendicular to the first and second directions, a portion of the stationary link group is directly underneath the first movable combtooth during the combdrive resting state; and
wherein the distance between the portion of the stationary link group and the stationary combteeth group is smaller than the distance between the portion of the stationary link group and the movable body portion during the combdrive resting state.

14. The torsional electrostatic combdrive of claim 13, wherein the rotated position of the movable assembly is adjusted in response to a capacitance value measured between the movable combteeth group and the stationary combteeth group.

15. The torsional electrostatic combdrive of claim 13, wherein the first stationary combtooth has a first average width value, wherein the first movable combtooth has a second average width value, and wherein the first average width value is smaller than the second average width value.

16. The torsional electrostatic combdrive of claim 13, wherein the stationary combteeth group further contains a plurality of stationary combteeth, wherein the stationary link group contains a plurality of stationary link members, and wherein the first, second, and plurality of stationary combteeth each are coupled to at least one of the plurality of stationary link members.

17. The torsional electrostatic combdrive of claim 13 further comprising an other stationary assembly including:
an other stationary body portion;
an other stationary combteeth group extending away from the other stationary body portion;
and
an other stationary link group, away from the stationary body portion, away from the other stationary body portion, and coupled to the other stationary combteeth group;
wherein the movable assembly further includes an other movable combteeth group extending away from the movable body portion in an opposite direction from the movable combteeth group and wherein the other stationary combteeth group of the other stationary assembly engages the other movable combteeth group.

18. The torsional electrostatic combdrive of claim 13, wherein the stationary link group contains a long stationary link member, wherein the stationary combteeth group further contains a plurality of stationary combteeth, wherein the first, second, and plurality of stationary combteeth each have a distal end that is furthest away from the stationary body portion, and wherein the distal ends thereof each are coupled to the long stationary link member.

19. The torsional electrostatic combdrive of claim 18, wherein the stationary assembly further includes a stationary support member extending away from the stationary body portion, wherein the long stationary link member is coupled to the stationary support member.

20. The torsional electrostatic combdrive of claim 13, wherein the movable assembly further includes a mirror and one or more torsional springs.

* * * * *